J. L. FATE.
METALLIC HEAT INSULATING VESSEL.
APPLICATION FILED MAY 14, 1909.
992,414.
Patented May 16, 1911.
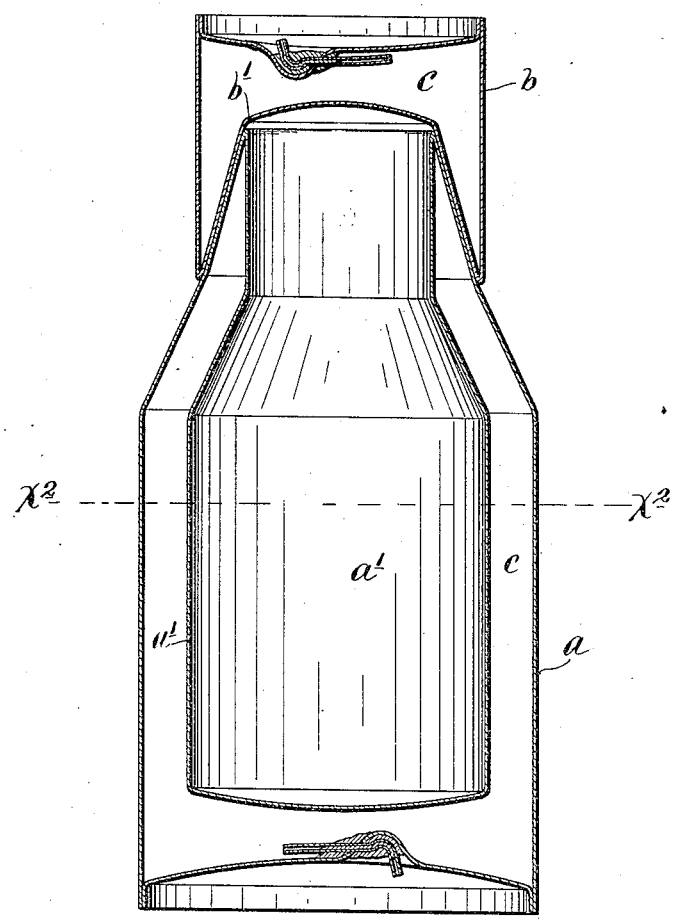
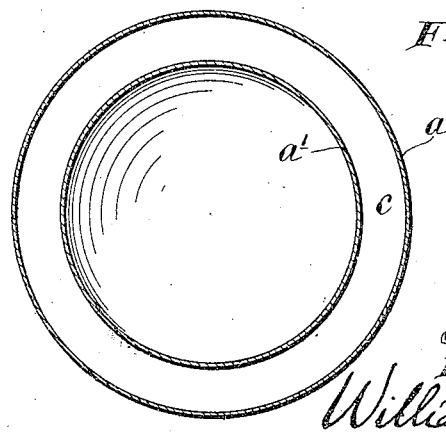
Witnesses:
Inventor:
John L. Fate
By his Attorneys:

UNITED STATES PATENT OFFICE.

JOHN LAMPSON FATE, OF CHICAGO, ILLINOIS, ASSIGNOR TO AMERICAN INSULATING COMPANY, A CORPORATION OF MAINE.

METALLIC HEAT-INSULATING VESSEL.

992,414. Specification of Letters Patent. Patented May 16, 1911.

Application filed May 14, 1909. Serial No. 496,036.

*To all whom it may concern:*

Be it known that I, JOHN LAMPSON FATE, a citizen of the United States, residing at Chicago, in the county of Cook and State of Illinois, have invented certain new and useful Improvements in Metallic Heat-Insulating Vessels; and I do hereby declare the following to be a full, clear, and exact description of the invention, such as will enable others skilled in the art to which it appertains to make and use the same.

My invention has for its object to provide a non-collapsible vacuum jacketed heat insulating vessel composed entirely of metal and of minimum weight; and to this end, the invention consists of the vessel having the novel features hereinafter disclosed and defined in the claims.

The invention is illustrated in the accompanying drawings, wherein like references refer to like parts throughout the several views.

In said drawings, Figure 1 is a vertical central section through the vessel, showing the parts as they appear when the vessel is ready for use; and Fig. 2 is a horizontal cross section on the line $x^2 \ x^2$ of Fig. 1.

The main receptacle is made up of an outer thin sheet metal shell $a$ and an inner thin sheet metal shell $a^1$ suspended from the upper end of the outer shell $a$; and the closure is made up of an outer thin sheet metal shell $b$ and an inner thin sheet metal shell $b^1$ suspended from the lower end of the outer shell $b$. The two shells $a$ and $a^1$ making up the main receptacle and the two shells $b$ and $b^1$ making up the closure, are suitably spaced apart from each other to afford between the same a vacuum chamber $c$ in each of said elements when the air is exhausted therefrom and the chambers are sealed.

The body portions of the main receptacle and of the closure are circular in cross section and the end walls of both of said elements are arched and made concave to the normal lines of the atmospheric pressure thereon, so that these strains are all tensile and can be withstood with less weight of metal. The upper end portion of the main receptacle and the lower end portion of the closure are of cylindro-conoidal form and telescope with each other; and these telescoping parts are so constructed that they fit together with substantially an air tight mouth joint. The forms of the structures thus secured from the said thin sheet metal shells, for the main receptacle and the closure, adapt the same to withstand the atmospheric pressure when the air is exhausted from the vacuum chambers afforded between the said pairs of shells. The inner shell of each element is supported from the outer shell to the best advantage, and the air pressure from within the storage chamber and from the external atmosphere is everywhere taken on arched or curvilinear surfaces best adapted to withstand the same and the vessel is, therefore, made non-collapsible with a minimum of weight. The thinness of the concentric metallic shells, making up the main receptacle and the closure, has this further great advantage, to-wit, that the power of heat conductivity in the walls of the vessel is thereby reduced to a minimum. This is of especial importance for minimizing the amount of heat units which will pass in from the external atmosphere to the storage chamber through the walls of the mouth joint formed by the telescoping parts of the main receptacle and its closure, in case of cold storage; and to prevent the outward passage of the heat units from the stored goods through these walls of the mouth joint, in the case of hot storage.

Inasmuch as the shells are thin and light, the weight of material is, of course, less and, hence, it follows that by this improved form of structure a non-collapsible jacket receptacle is secured, made entirely out of metal, and which is of less cost than can be made from metal in any other way.

The several advantages above noted particularly well adapt this vessel for use in the long distance transportation of perishable commodities, such, for example, as milk and oysters, at a minimum of cost.

The air is exhausted from the vacuum chamber $c$ and these chambers are then sealed in any suitable way. Preferably I employ the means disclosed and claimed in my Patents 926,694 of June 29, 1909, entitled "Sealing nipple for vacuum jackets," and 930,950 of August 10, 1909, entitled "Method of sealing vacuum jackets."

What I claim is:

1. A heat insulating vessel composed of concentric thin sheet metal cylindrical shells with the inner supported from the mouth of the outer shell, the two shells spaced apart to afford between the same a vacuum chamber, and so shaped and joined together as to make a cylindro-conoidal vacuum jacket having end walls which are concave on their air exposed faces, substantially as described.

2. A heat insulating vessel made up of the main receptacle and the closure for the same, both of which elements are composed of pairs of concentric thin sheet metal shells with the inner supported from the mouth of the outer shell and the two shells spaced apart to afford between the same a vacuum chamber and which pairs of shells are so shaped and joined together as to make up two coöperating cylindro-conoidal vacuum jackets with end walls which are concave on their air exposed faces, and which two vacuum jackets are adapted to have their open conoidal end portions telescope with each other to close the storage chamber, substantially as described.

In testimony whereof I affix my signature in presence of two witnesses.

JOHN LAMPSON FATE.

Witnesses:
K. BUGNER,
G. L. TOALE.